United States Patent [19]
Ravipati et al.

[11] Patent Number: 5,928,715
[45] Date of Patent: Jul. 27, 1999

[54] THIN FILM MAGNETORESISTIVE DEVICE HAVING CONTIGUOUS MAGNETORESISTIVE, HARD BIAS AND LEAD LAYER JUNCTIONS WITH EACH HARD BIAS LAYER EXTENDING OUTWARDLY BEYOND OUTSIDE EDGES OF EACH RESPECTIVE LEAD LAYER

[75] Inventors: Durga P. Ravipati, Saratoga; Steven Clark Rudy, San Jose, both of Calif.

[73] Assignee: Read-Rite Corporation, Milpitas, Calif.

[21] Appl. No.: 08/901,155

[22] Filed: Jul. 28, 1997

Related U.S. Application Data

[63] Continuation of application No. 08/548,685, Oct. 26, 1995, abandoned.

[51] Int. Cl.[6] .................................................. B05D 5/12
[52] U.S. Cl. ........................ 427/130; 427/131; 427/132; 29/603.01
[58] Field of Search ................................ 360/113, 11 B; 427/123, 127–130; 29/603.01

[56] References Cited

U.S. PATENT DOCUMENTS

| | | | |
|---|---|---|---|
| 4,622,613 | 11/1986 | Nomura et al. | 360/113 |
| 5,412,524 | 5/1995 | Nagata et al. | 360/113 |
| 5,420,736 | 5/1995 | Heim et al. | 360/113 |
| 5,430,592 | 7/1995 | Yoda | 427/130 |
| 5,438,470 | 8/1995 | Ravipati et al. | 360/113 |
| 5,461,526 | 10/1995 | Hamakawa et al. | 360/113 |
| 5,461,527 | 10/1995 | Akiyama et al. | 360/113 |
| 5,485,334 | 1/1996 | Nix et al. | 360/113 |
| 5,532,892 | 7/1996 | Nix et al. | 360/113 |
| 5,608,593 | 3/1997 | Kim et al. | 360/113 |
| 5,664,316 | 9/1997 | Chen et al. | 427/130 |

*Primary Examiner*—Brian K. Talbot
*Attorney, Agent, or Firm*—Nathan N. Kallman

[57] ABSTRACT

A magnetoresistive read transducer includes a magnetoresistive (MR) layer having end regions spaced by a central active region. A pair of hard magnetic layers provide longitudinal magnetic bias to the MR layer, with each of the hard magnetic bias layers disposed in contact with one of the end regions of the MR layer. A pair of electrical lead members are disposed in contact with the end regions of the MR layer and with the hard magnetic bias layers. The hard magnetic bias layers and the electrical lead members are deposited, followed by selective removal of portions of the lead members to expose the edges of the hard bias material.

1 Claim, 3 Drawing Sheets

THIN FILM MAGNETORESISTIVE DEVICE HAVING CONTIGUOUS MAGNETORESISTIVE, HARD BIAS AND LEAD LAYER JUNCTIONS WITH EACH HARD BIAS LAYER EXTENDING OUTWARDLY BEYOND OUTSIDE EDGES OF EACH RESPECTIVE LEAD LAYER

CROSS-REFERENCE TO RELATED APPLICATION

This application is a continuation of application Ser. No. 08/548,685, filed Oct. 26, 1995, now abandoned.

Copending application Ser. No. 08/176,193, filed Jan. 3, 1994, Pending assigned to the same assignee as the present application, discloses magnetoresistive (MR) transducer fabrication involving sequential deposition of conductive layers on permanent magnet layers. That application is incorporated herein by reference.

FIELD OF THE INVENTION

This invention relates to thin film MR transducer structures and in particular to such MR structures incorporating conductive lead members and hard bias members with lowered resistance and simplified fabrication techniques.

DESCRIPTION OF THE PRIOR ART

Inductive sensors were commonly used in the past for the detection of magnetically recorded information, but more recently different types of MR structures have been used. There are several advantages to using an MR element in a magnetic read transducer. First, present day thin-film technology allows MR transducers applicable to high density storage applications to be fabricated on a miniaturized scale so that the MR transducer can read information from a recording medium with much narrower track widths than previously. Additionally, the output signals generated by an MR transducer during the read process are independent of the speed of the recording medium and are of significantly higher output amplitude. As a result, larger signal amplitude, using known pulse slimming techniques, can be used to further increase the linear density of the signal.

U.S. Pat. No. 4,663,685 and 5,005,096 describe MR transducers with a current path from connecting leads and a coextensive region of longitudinal bias permanent magnet material. However, these patents also describe the use of an additional coextensive conductive layer which could produce an undesirable further increase in the electrical resistance of the current path to the MR layer.

U.S. Pat. No. 5,438,470, issued Aug. 1, 1995 and assigned to the same assignee as the present application, discloses an MR transducer in which first and second hard magnetic layers are in abutting contact with the ends of an MR layer, and first and second electrical leads are disposed in contact with the ends of the MR layer to form a direct electrical path of low lead resistance. That patent is incorporated herein by reference.

In the MR sensor manufacturing process described in application Ser. No. 08/176,193 identified above, fabrication involves, after forming shield members and a nonmagnetic gap and deposition of the materials which forms the MR member, the steps of (1) masking the deposited MR material in the desired configuration of the MR member and ion milling the MR material outside the masked area to produce the MR layer; (2) masking to the desired configuration of the hard bias layer and a first lead layer (lead 1), forming a contiguous junction between the MR layer, the lead layers and the hard bias layers by ion milling, depositing the hard bias layers and lead 1 layers, and then lifting off the masking; and (3) masking for the second lead layers (lead 2), depositing material for lead 2 layers on a portion of the lead 1 layers, and removing the masking for the lead 2 layers deposition.

This sequential process, although it produces an MR structure with improved characteristics in comparison with prior art structures, it does add additional steps to the process and can add to the MR resistance value and to the contact resistance at the interface between the lead 1 layers and the lead 2 layers, and raise the risk of contamination of the MR layer.

SUMMARY OF THE INVENTION

In accordance with the present invention, the structure of a thin film MR transducer is formed with a first lead layer and a second lead layer is and produced by depositing a hard bias layer and both lead layers in the same operation. After producing the shield layers and the gap and depositing materials for the MR layer, the present process involves masking areas for the hard bias layers and the combined first lead and second lead layers and then ion milling the MR material in an enlarged area to accommodate the hard bias layers and the lead 1 and lead 2 layers, depositing the hard bias layers and then depositing the lead 1 and lead 2 layers at the same time, and lifting off the masking. Then, the structure is masked to expose a portion of the hard bias layers on the edges thereof and this exposed portion is uncovered by ion milling of the overlying lead material. The MR layer is then ion milled to clearly define the MR stripe.

DESCRIPTION OF THE PREFERRED EMBODIMENT

Figure 1:
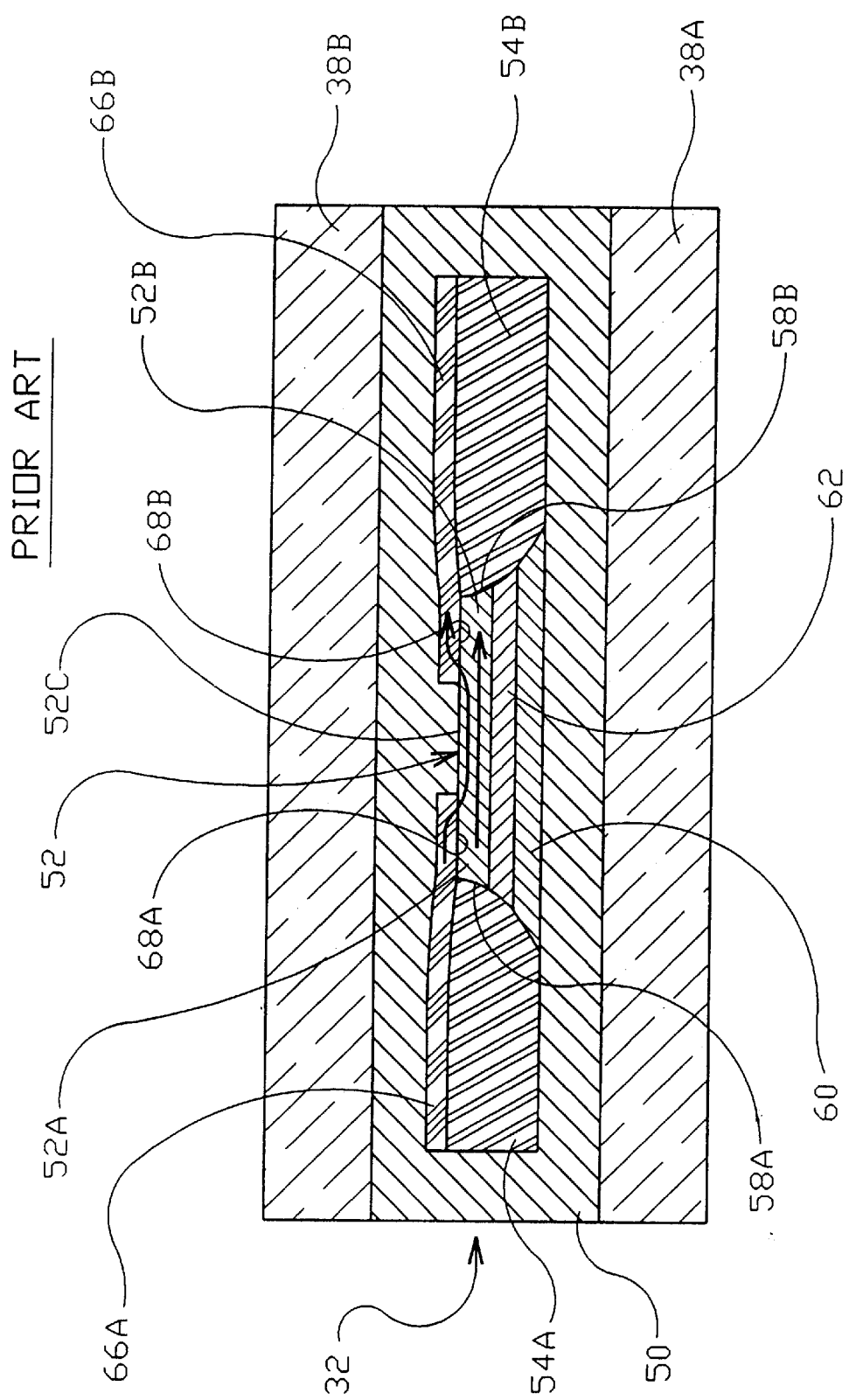
FIG. 1 is a cross-sectional view of the MR read transducer of U.S. Pat. No. 5,438,470 identified above.

FIG. 1 is a cross-sectional view of the MR transducer of U.S. Pat. No. 5,438,470 identified above, taken along a plane parallel to the air bearing surface (ABS) of the device. The transducer, generally designated by reference numeral 32, comprises a multi-layer structure positioned between a pair of shields 38A and 38B and an insulating dielectric 50. The multi-layer structure includes an MR layer 52 of soft ferromagnetic material having a low coercive force. During the read process, changes in magnetic flux passing through MR layer 52 vary the resistivity of layer 52. This characteristic establishes the basis for the read capability of the transducer.

As is known, to supress Barkhausen noise, MR layer 52 should be aligned in a single-domain state. Hard magnetic layers 54A and 54B carry out this function by providing a longitudinal magnetic bias to layer 52 through junctions 58A and 58B. Additionally, for layer 52 to operate within a linear region, another bias, called transverse magnetic bias, must also be applied to layer 52. Layer 52 has end regions 52A, 52B and a central active region 52C. A soft adjacent layer (SAL) 60 is disposed adjacent to MR layer 52 to accomplish this function. Soft adjacent layer 60 and MR layer 52 are separated from each other by a spacer layer 62 of a non-magnetic material. Soft adjacent layer 60 may be formed of a magnetic material having a high permeability and is essentially magnetically saturated in a direction transverse to the longitudinal bias derived from the hard magnetic layer.

During the read mode, a bias current is applied through electrical leads 66A and 66B made of an electrically conductive material. The bias current passes through MR layer 52 by way of hard-magnetic layers 54A and 54B and junctions 68A and 68B. As mentioned previously, changes in the magnetic flux intercepted by the transducer vary the electrical resistivity of MR layer 52 so that the current passing through layer 52 generates a varying voltage. The varying voltage is a function of the strength of the flux signals read out from the storage medium. This varying voltage is available at electrical leads 66A, 66B and is supplied to a sense amplifier (not shown) for amplification.

Figure 2A:
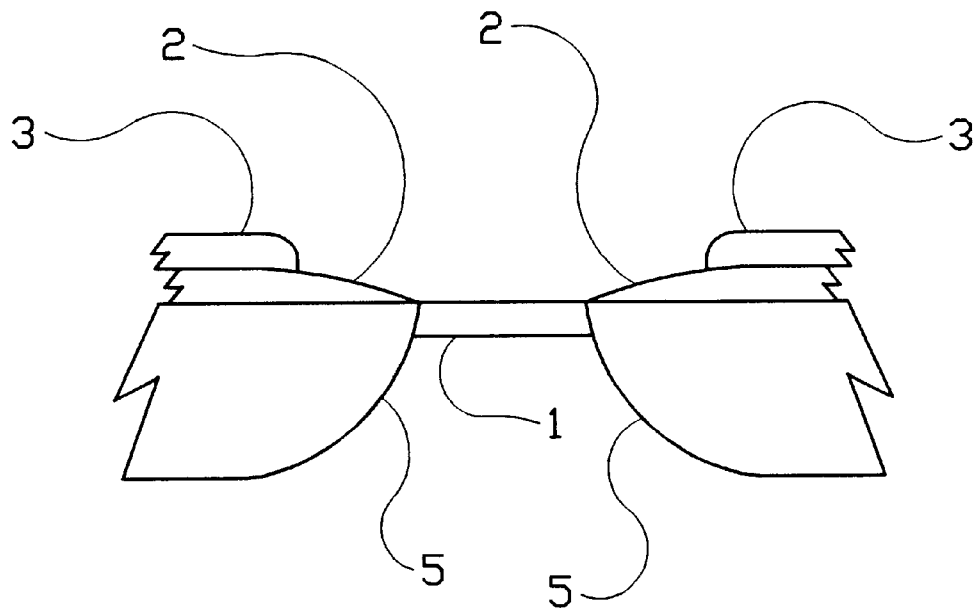
FIGS. 2A and 2B show the structure resulting from the sequential deposition of the lead 1 and lead 2 layers described in copending application Ser. No. 08/176,193 identified above.
Figure 2B:
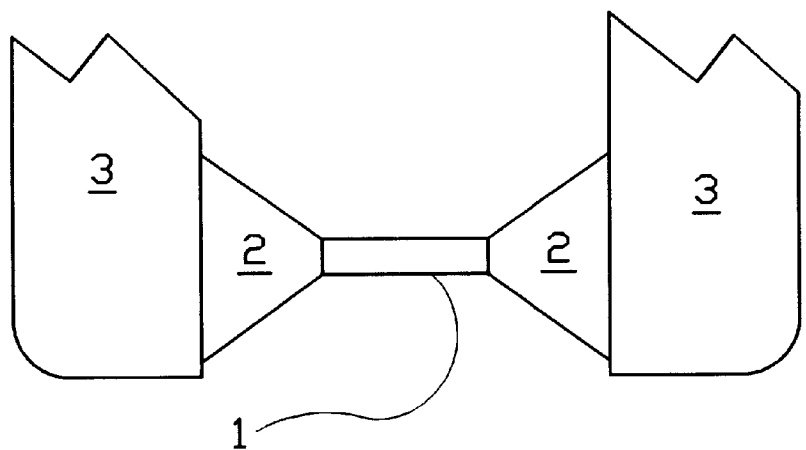

One structure resulting from the process described in the above-identified copending application Ser. No. 08/176,193, in which the lead 1 and lead 2 members are deposited sequentially, is shown in FIGS. 2A and 2B. The structure includes a multilayer MR member 1 with adjacent layers 2 of first lead material overlying layers of permanent magnet hard bias material 5. Both the first lead layers 2 and the permanent magnet bias layers 5 form contiguous junctions with the opposite ends of MR member 1. Reference numeral 3 designates the second lead layers which are subsequently deposited on portions of the first lead layers 2.

Figure 3A:
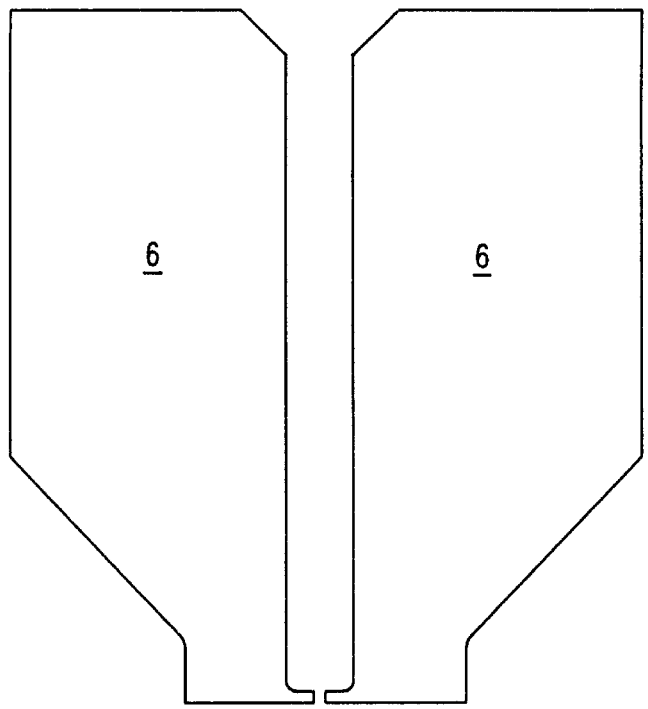
FIGS. 3A and 3B show one surface of an MR sensing device in accordance with this invention before and after the second stage of the fabrication process.
Figure 3B:
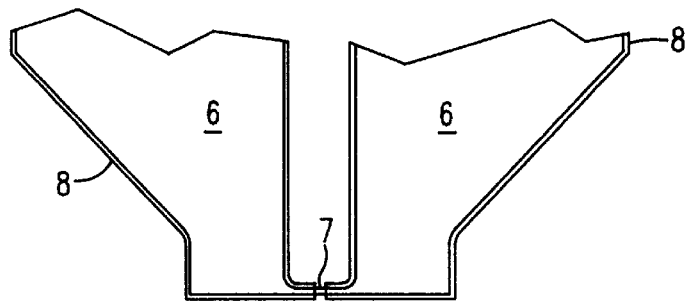

FIGS. 3A and 3B illustrate the structure resulting from the steps in the process of the present invention in fabricating an MR sensing device. FIG. 3A shows the structure resulting from the deposition of a lead layer 6 on a permanent magnet layer. The ends of the permanent magnet hard bias layers and the ends of the lead layer form contiguous junctions with the opposite ends of the MR layer. FIG. 3B shows the structure with the outside edges of lead layers 6 milled away to expose the outside edges of the underlying permanent magnet hard bias layer 8. MR layer 7 is then masked and milled to clearly define the MR stripe in the gap area.

Figure 4:
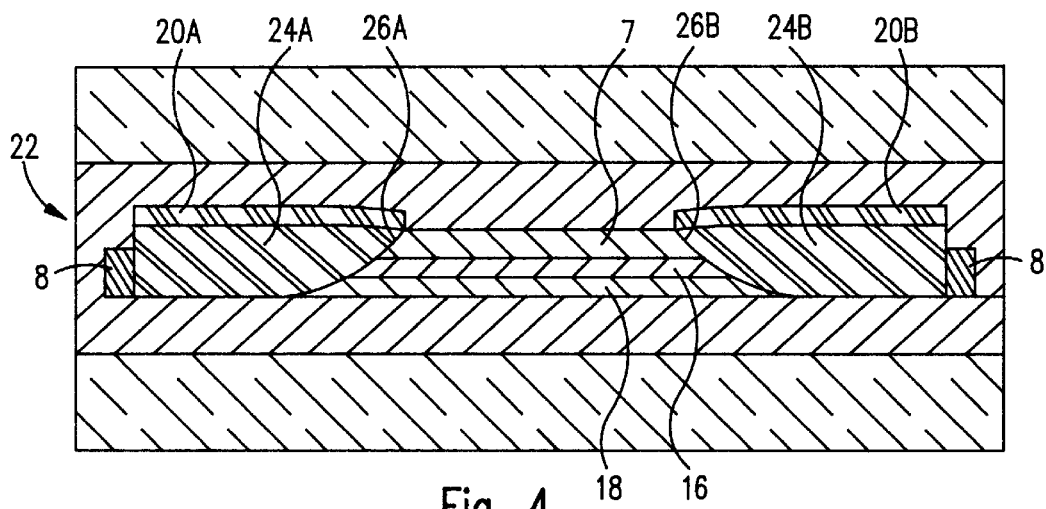
FIG. 4 is a cross-sectional view of the thin film MR read transducer, made in accordance with the invention.

FIG. 4 depicts the novel thin film magnetic transducer 22 of this invention having hard magnetic bias layers 24A and 24B, which correspond to permanent magnet bias layer in FIG. 3B. The layers 24A and 24B form abutting junctions 26A and 26B, with MR layer 7. Hard magnetic layers 24A and 24B supply a continuous longitudinal magnetic bias and provide a direct current path to MR layer 7. A spacer layer 16 is disposed between the Mr layer 7 and a soft adjacent layer 18. During the read mode, sense current is directed through MR layer 7 by means of electrical leads 20A and 20B which correspond to lead layers 6 in FIGS. 3A and 3B.

The lead layers 6 are disposed in contact with MR layer 7 and hard magnetic bias layers 24A and 24B.

The structure and process of the present invention provide reduced sensitivity to short circuits in the resulting transducer and also produce less risk of corrosion because of the simplified processing involved.

What is claimed is:

1. A method of fabricating a magnetoresistive transducer comprising the steps of providing a nonmagnetic substrate;

depositing an insulation layer above said substrate;

then depositing a soft adjacent layer on said insulation layer;

then depositing a spacer layer over said soft adjacent layer;

then depositing a magnetoresistive layer, defined by ends and a top surface, over said spacer layer to fabricate a multi-layer magnetoresistive structure consisting of said soft adjacent layer, said spacer layer, and said magnetoresistive layer;

then milling said ends of said magnetoresistive layer for defining and forming contiguous junctions;

then depositing with a common mask first and second permanent magnet hard bias layers having ends at said ends of said magnetoresistive layer and adjacent to said multi-layer magnetoresistive structure for forming contiguous junctions between said hard bias layers and said multi-layer magnetoresistive structure;

with the same common mask used for depositing said permanent magnet hard bias layers, depositing first and second conductor layers defined by ends over a portion of the top surface of said magnetoresistive layer and over said first and second permanent magnet bias layers respectively and in electrical contact with said magnetoresistive layer;

wherein a portion of said magnetoresistive layer disposed between the ends of said first and second permanent magnet bias layers constitutes a central active region and said permanent magnet bias layers have outer edges spaced from said central active region;

then removing portions of said conductor layers at the outer edges of said permanent magnet bias layers; and after depositing said permanent magnet bias layers and said conductor layers, masking and milling said magnetoresistive layer between the ends of said conductor layers so that the central active region of said magnetoresistive layer is clearly defined;

whereby said magnetoresistive transducer is characterized by reduced sensitivity to electrical short circuits and minimized risk of corrosion.

* * * * *